United States Patent [19]

Smith et al.

[11] 3,916,705

[45] Nov. 4, 1975

[54] VARIABLE SPEED TRANSMISSION GEAR BOXES

[75] Inventors: Brian Frank Smith, Oldham; Norman Partington, Woodford, both of England

[73] Assignee: Platt International Limited, England

[22] Filed: Jan. 18, 1974

[21] Appl. No.: 434,676

[30] Foreign Application Priority Data

Jan. 19, 1973 United Kingdom.............. 2796/73

[52] U.S. Cl. ................. 74/230.17 A; 74/230.17 M
[51] Int. Cl.² ..................................... F16H 55/52
[58] Field of Search ........... 74/230.17 A, 230.17 M

[56] References Cited
UNITED STATES PATENTS

| | | | |
|---|---|---|---|
| 3,090,246 | 5/1963 | Berens ........................ | 74/230.17 A |
| 3,097,540 | 7/1963 | Berens ........................ | 74/230.17 A |
| 3,136,169 | 6/1964 | Karger et al. ................ | 74/230.17 A |
| 3,490,301 | 1/1970 | Steuer ........................ | 74/230.17 A |
| 3,561,279 | 2/1971 | Beneke ....................... | 74/230.17 A X |

*Primary Examiner*—Leonard H. Gerin
*Attorney, Agent, or Firm*—Watson, Cole, Grindle & Watson

[57] ABSTRACT

A flexible endless driving member tensioning arrangement having a torque applying mechanism. The torque applying mechanism includes a gear drive transmission having a rotatable gear member and an input shaft. The input shaft can be locked in any one of a plurality of angular positions. A torque applying spring is connected at one end of a tensioning shaft of the arrangement and at the other end to the rotatable gear member. The rotation of the shaft in one direction thus rotates the rotatable gear member so as to increase the tension of the torque applying spring. Rotation of the input shaft in the opposite direction causes a relaxation of the torque applying spring.

16 Claims, 2 Drawing Figures

VARIABLE SPEED TRANSMISSION GEAR BOXES

BACKGROUND OF THE INVENTION

The present invention relates to an automatic chain or belt tensioning arrangement for use in tensioning an endless driving chain or belt in a positive infinitely variable speed gear system. The gear system is of the type in which the drive from an input shaft of the gear to an output shaft thereof is effected by an endless driving chain or belt which passes round and is drivably engaged by a cone pulley on the input shaft and which passes round and drivingly engages a cone pulley mounted on the output shaft. Each cone pulley includes a pair of discs having opposed conical faces engaged by the chain or belt and being relatively axially displaceable on the shaft under the control of a pair of pivotal control levers so arranged as by pivotal movement thereof in opposite senses to cause the separation of the discs on one shaft and the separation of the discs on the other shaft to be differentially varied so that the effective driving diameters of the discs are differentially varied and give rise to a change in the speed ratio between the input shaft and the output shaft.

The chain or belt tensioning arrangement commonly employed with a gear of the aforementioned type and hereinafter referred to as a chain or belt tensioning arrangement of the type specified, includes a tensioning shaft which supports a fulcrum element of one of the levers on a portion of the tensioning shaft provided with a screw thread of one hand and which supports a fulcrum element of the other of the levers on a portion of the tensioning shaft provided with a screw thread of the opposite hand. Turning of the shaft causes movement of the fulcrum elements along the shaft in opposite directions. The arrangements also include a torque applying mechanism for applying to the tensioning shaft a torque which urges the two fulcrum elements toward each other to maintain the chain or belt under a predetermined tension, gradual wear of the chain or belt being taken up by the gradual turning of the tensioning shaft in a direction bringing the fulcrum elements of the two levers closer together.

SUMMARY OF THE INVENTION

Some complex chain or belt tensioning arrangements have hitherto been proposed and it is an object of the present invention to provide an alternative tensioning arrangement of simple construction.

According to one aspect of the invention there is provided a chain or belt tensioning arrangement of the type specified, wherein the torque applying mechanism includes a gear drive transmission mechanism including a rotatable gear member and an input shaft lockable in any one of a number of angular positions, and a torque applying spring connected at one end to the tensioning shaft and at the other end to the rotatable gear member. The arrangement is such that rotation of the input shaft in one direction rotates the rotatable gear member to tension the torque applying spring and such that rotation of the input shaft in the other direction relaxes the torque applying spring.

According to a second aspect of the invention there is provided a positive infinitely variable speed gear of the aforementioned type including a chain or belt tensioning arrangement according to the first aspect of the invention.

BRIEF DESCRIPTION OF THE DRAWINGS

One embodiment of the invention will now be described by way of example with reference to the accompanying drawings in which.

DESCRIPTION OF THE PREFERRED EMBODIMENT

Figure 1:
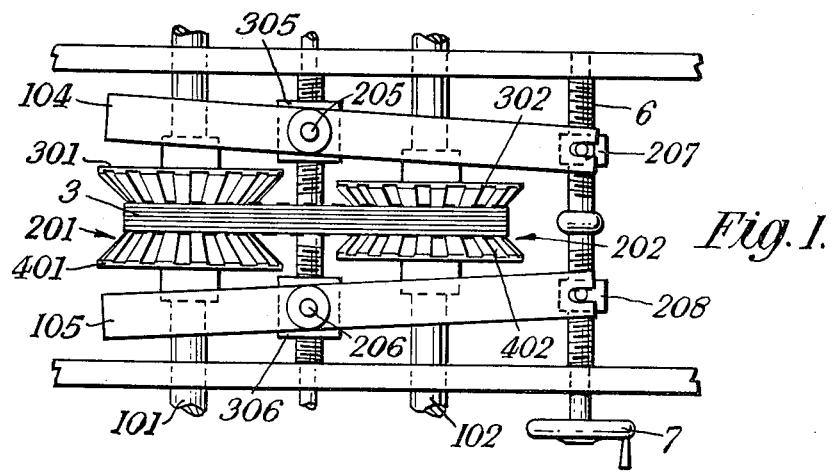
FIG. 1 is a plan view of a conventional positive infinitely variable speed gear of the type specified.

Referring first to FIG. 1, the gear arrangement shown includes an input drive shaft 101 provided with a cone pulley 201 formed by a pair of conically faced discs 301 and 401 which are arranged for rotation with the shaft 101 but axially slidable along the shaft toward and away from each other. An output shaft 102 is similarly provided with a cone pulley 202 consisting of a pair of conically faced discs 302 and 402 which are arranged for rotation on the output shaft 102 but are axially slidable along the shaft toward and away from each other. Each of the discs 301, 401 and 302, 402 is carried on a boss mounted on the shaft supporting the disc. The bosses carrying the discs 301 and 302 are engaged by a pivotal control lever 104 and likewise the bosses carrying discs 401 and 402 are engaged by a pivotal control lever 105. While the control levers permit free rotation of the discs, they also provide for sliding movement of them on their shafts in opposite directions. The pivotal control levers 104 and 105 are pivotally mounted at points 205 and 206 on internally screw-threaded bosses 305 and 306, which are screw-threaded on to a tensioning shaft 8. An endless chain 3 passes round the two cone pulleys 201 and 202 and engages the opposing conical faces of the discs of each pulley.

Separation of the discs of the two cone pulleys 201 and 202 is differentially varied by pivoting of the levers 104 and 105 in opposite directions about their pivot points 205 and 206. This pivoting movement is achieved by arranging for the right-hand ends of the two levers to be engaged by upstanding pins carried on internally threaded bosses 207 and 208, which are screw-threaded on to a control shaft 6 provided with a hand-wheel 7. The portion of the control shaft carrying the boss 207 is screw-threaded in one direction and the portion of the shaft carrying the boss 208 is screw-threaded in the opposite direction. As the hand-wheel 7 is turned, the righthand ends of the levers 104 and 105 move either apart or together and give rise to a differential variation in the separation of the discs of the two cone pulleys 201 and 202.

The boss 305 pivotally supporting the lever 104 is threaded on a portion of the tensioning shaft 8 provided with a screw thread 9 of one hand while the boss 306 pivotally supporting the control lever 105 is carried on a portion of the shaft 8 having a screw thread 10 of opposite hand. The taking up of any wear or slack in the chain 3 is achieved by applying a torque to the tensioning shaft 8, which tends to draw the two bosses 305 and 306 towards each other.

Figure 2:
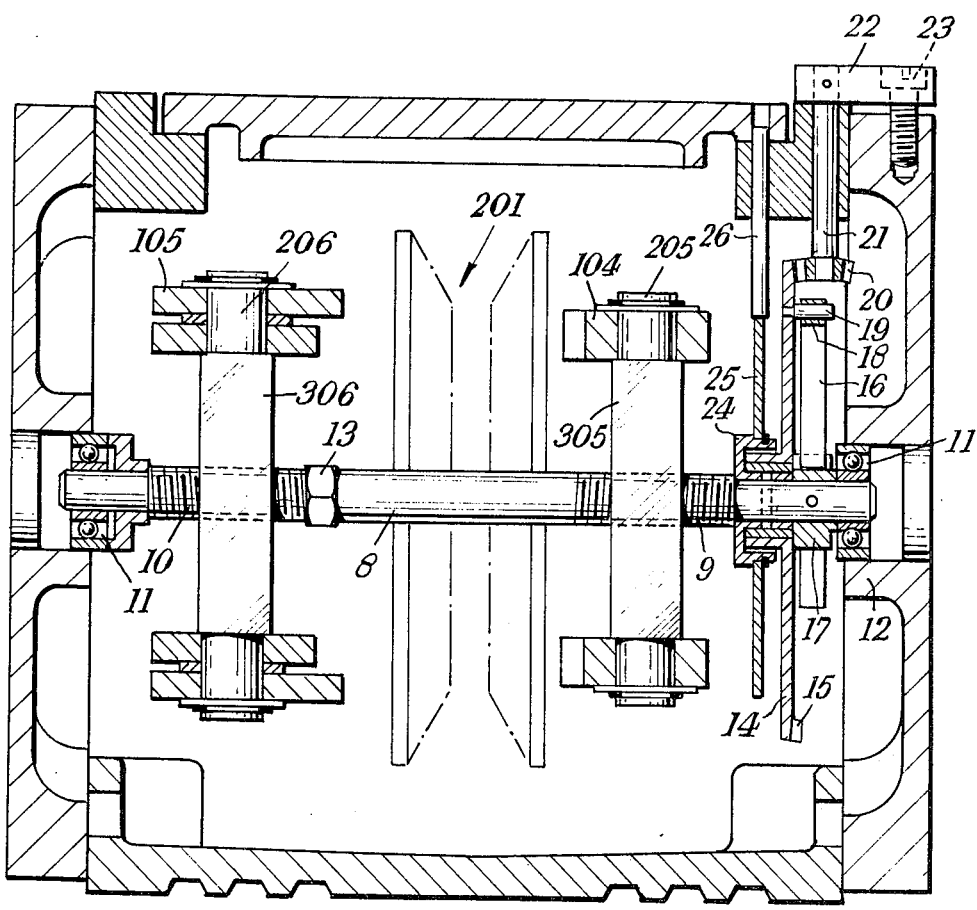
FIG. 2 is a cross-sectional view of a chain tensioning arrangement according to an embodiment of the invention.

Referring now to FIG. 2, the tensioning shaft 8 is mounted for rotation in end bearings 11 supported in a casing 12 and is provided with a hexagonal portion 13 at the inner end of the left-hand threaded portion 10.

A bevel gear 14 is mounted on the tensioning shaft 8 for free rotation relatively thereto about an axis coaxial therewith. The bevel gear 14 has teeth 15 formed around its periphery. A coil spring 16 encircles the tensioning shaft 8 and has its inner end connected to a sleeve 17 fixably mounted for rotation with the tensioning shaft 8 and its outer end 18 connected to a peg 19 extending axially from bevel gear 14 toward the periphery thereof.

A second bevel gear wheel 20, carried on an input shaft 21, is in meshing engagement with the first bevel gear wheel 14. The input shaft 21 rotates about an axis which is normal to the axis of the tensioning shaft 8 and is carried in a bore in the casing 12. The end of the input shaft 21 remote from the second gear wheel 20 extends above the outer surface of the casing 12 and has connected thereto an arm 22 which extends radially from the input shaft 21. The radially outer end of the arm 22 is formed with a hole through which extends a screw 23 which engages with a screw thread formed in the casing 12.

A bush 24 is also anchored to the tensioning shaft 8 and carries a snail cam 25 which can be rotated against friction to any angular position relatively to the bush 24 where it is held by such friction. Alternatively, a ratchet and pawl arrangement may be used. An indicator pin 26 is slidably mounted in a bore in the casing 12 and its lower end abuts the rim of the cam 25. The axial displacement of the pin 26 by rotation of the cam 25 with the tensioning shaft 8 gives a visual indication of the angular position of the tensioning shaft and thus the amount of wear in the chain.

With the new chain 3 fitted round the conical pulleys 201 and 202 (see FIG. 1) the spring 16, which is under tension, applies torque to the tensioning shaft 8 which tends to draw the two control levers 104, 105 together and exert a tensioning thrust on the chain 3. As the chain wears, the tensioning shaft 8 turns to maintain the tensioning thrust on the chain 3 and in doing so the spring 16 unwinds to some extent.

When the indicator pin 26 indicates that a worn chain needs to be replaced by new chain, the screw 23 is unscrewed and the arm 22 allowed to rotate. The residual tension in the spring 16 turns bevel gear 14 and thus turns the output shaft 21 until the spring 16 is no longer under tension.

The hexagonal portion 13 of the tensioning shaft 8 is then turned with a spanner and the control levers 104, 105 are thus moved apart axially on the bosses 305, 306.

Thus the cones 301, 401 and 302, 402 of the pulleys 201, 202 are opened to allow removal of the worn chain.

The new chain is then fitted into the pulleys 201, 202 and the hexagonal portion 13 of the tension shaft 8 is turned with a spanner to close the cones 301, 401 and 302, 402 of the pulleys 201, 202 respectively until they contact the new chain 3. The arm 23 is then rotated in a direction opposite to the unwinding direction to rotate the input shaft which in turn rotates the bevel gear 14 through the gears 15, 20. The rotation of the bevel gear 14 also rotates the peg holding the outer end of the coil spring 16 and rotation is continued until the tension in the coil spring 16 reaches a predetermined value. The arm 22 is then locked in position by re-insertion of the screw 23 and the bevel gear 14 is thus restrained against rotation.

The cam 25 is then rotated against friction so that the pin 26 gives a zero wear reading. The transmission is then ready for operation.

It will be appreciated that while the arrangement described with reference to the drawings shows only two meshing gear wheels 14, 20 additional gear wheels may be provided between these gear wheels 14, 20 to form a meshing gear train.

What we claim is:

1. An automatic tensioning arrangement for tensioning a flexible endless driving member in a positive infinitely variable speed gear including: an input shaft; an input cone pulley formed by a pair of discs having opposed conical faces and mounted on the input shaft for relative axial movement; an output shaft; an output cone pulley formed by a pair of discs having opposed conical faces and mounted on the output shaft for relative axial movement; the flexible endless driving member passes around the input cone pulley and the output cone pulley thereby transmitting a drive force between the pulleys; a pair of pivotal control levers, the ends of one of the levers being connected to one of the discs of the input pulley and one of the discs of the output pulley and the ends of the other lever being connected to the other of the discs of the input pulley and the other of the discs of the output pulley; two fulcrum elements, each pivotally supporting one of the control levers; means for pivoting the control levers about the fulcrum elements to differentially vary the effective driving diameters of the input and output pulleys and change the speed ratio between the input shaft and the output shaft; a tensioning shaft having a first screw threaded portion of one hand on the tensioning shaft for supporting one of the fulcrum elements and a second screw threaded portion of the other hand on the tensioning shaft for supporting the other of the fulcrum elements; the automatic tensioning arrangement comprising:

gear drive transmission means having a rotatable gear member and an angularly movable tensioning input shaft;

means for locking the tensioning input shaft in any one of a number of angular positions;

torque applying spring connected at one end to the tensioning shaft and at the other end to the rotatable gear member whereby rotation of the tensioning input shaft in one direction rotates the rotatable gear member to tension the torque applying spring which urges the two fulcrum elements towards each other so as to maintain the flexible endless driving member under a predetermined tension and which takes up gradual wear in the flexible endless driving member by movement of the two fulcrum elements towards each other as such wear occurs and whereby rotation of the tensioning input shaft in the other direction relaxes the torque applying spring.

2. An arrangement according to claim 1 wherein the rotatable gear member comprises a gear wheel mounted on the tensioning shaft for free rotation relatively thereto about an axis coaxial therewith.

3. An arrangement according to claim 2, wherein the torque applying spring comprises a coil spring arranged around the tensioning shaft with one end connected to the shaft and the other end connected to the gear wheel.

4. An arrangement according to claim 3 wherein the coil spring lies in a plane parallel to the plane of the rotatable gear member and wherein the rotatable gear member includes a peg projecting in an axial direction to which said other end of the coil spring is connected.

5. An arrangement according to claim 1 wherein the rotation of the tensioning input shaft is transmitted to the rotatable gear member by a meshing gear train therebetween.

6. An arrangement according to claim 5 wherein the gear train includes a second gear wheel associated with the tensioning input shaft.

7. An arrangement according to claim 6 wherein the rotatable gear member meshes directly with the second gear wheel.

8. An arrangement according to claim 7 wherein the rotatable gear member and the second gear wheel are bevel gears so that the tensioning input shaft rotates about an axis normal to the axis of the tensioning shaft.

9. An arrangement according to claim 1 wherein the input shaft has a lever arm extending radially therefrom by which the input shaft may be rotated.

10. An arrangement according to claim 9 wherein the lever arm is lockable against rotation to lock the rotatable gear member against rotation.

11. An arrangement according to claim 9 wherein the rotation of the input shaft is transmitted to the rotatable gear member by a meshing gear train arranged therebetween, the gear train including a first gear wheel associated with the input shaft and wherein there is provided a casing surrounding the arrangement, the tensioning input shaft extending through the casing from the exterior thereof to the interior thereof with a second gear wheel being mounted at the interior end of the tensioning input shaft and the lever arm mounted at the exterior end of the tensioning input shaft.

12. An arrangement according to claim 11 wherein the radially outer end of the lever arm is lockable to the casing by means of a screw extending through the lever arm and into a cooperating thread in the casing.

13. An arrangement according to claim 1 wherein a flexible endless driving member wear indicating device is provided for visually indicating the amount of the wear of the flexible endless driving member.

14. An arrangement according to claim 13 wherein the flexible endless driving member wear indicating device comprises a cam mounted for rotation with the tensioning shaft and an indicating member in camming engagement therewith so that rotation of the tensioning shaft caused by wear of the chain results in corresponding movement of the indicating device.

15. An arrangement according to claim 14 wherein the cam is rotatable relatively to the tensioning shaft to enable the indicating member to be set at a predetermined initial position.

16. An arrangement according to claim 15 wherein there is provided a casing surrounding the arrangement, the indicating member comprises an indicating pin which slides in a bore in the casing, the axial position of the pin in the bore indicating the amount of the wear of the flexible endless driving member.

* * * * *